United States Patent [19]

Beemster et al.

[11] Patent Number: 4,609,471

[45] Date of Patent: Sep. 2, 1986

[54] LASER DISINFECTION OF FLUIDS ENHANCED BY GAS BUBBLES

[75] Inventors: Bernard J. Beemster, Mequon; Paul R. Goudy, Jr., Milwaukee, both of Wis.

[73] Assignee: Autotrol Corporation, Milwaukee, Wis.

[21] Appl. No.: 603,566

[22] Filed: Apr. 25, 1984

[51] Int. Cl.⁴ .............................................. C02F 1/32
[52] U.S. Cl. .................................. 210/748; 210/760; 210/764; 422/24
[58] Field of Search ............. 210/748, 745, 764, 96.1, 210/97, 192, 243, 760, 754, 758; 422/22–24, 29, 32, 906

[56] References Cited

U.S. PATENT DOCUMENTS

| | | | |
|---|---|---|---|
| 3,757,248 | 9/1973 | Small | 331/94.5 |
| 4,042,504 | 8/1977 | Bowen | 210/192 |
| 4,115,280 | 9/1978 | Pratt, Jr. | 250/527 |
| 4,204,956 | 5/1980 | Flatow | 210/192 X |
| 4,265,747 | 5/1981 | Copa et al. | 210/764 X |
| 4,273,660 | 6/1981 | Beitzel | 210/192 X |
| 4,274,970 | 6/1981 | Beitzel | 210/192 X |
| 4,400,270 | 8/1980 | Hillman | 210/103 |

OTHER PUBLICATIONS

"Scientific-American", vol. 228, No. 6, Jun., 1973, pp. 112–115.
"Scientific-American", vol. 230, No. 6, Jun., 1974, pp. 122–127.

Primary Examiner—Thomas Wyse
Attorney, Agent, or Firm—Quarles & Brady

[57] ABSTRACT

A method of disinfecting a liquid includes introducing bubbles of a gas into a stream of liquid to be treated and passing the stream with the bubbles through a laser beam which radiates coherent light in the ultraviolet range. The gas may be selected from ozone, oxygen, hydrogen and chlorine or other halogens.

5 Claims, 3 Drawing Figures

LASER DISINFECTION OF FLUIDS ENHANCED BY GAS BUBBLES

BACKGROUND OF THE INVENTION

This invention relates to a method and apparatus for disinfecting water, and particularly to such an apparatus and method which employs coherent ultraviolet light generated by a laser the effect of which is enhanced by the dispersal of a gas in the liquid being treated.

In U.S. patent application Ser. No. 571,228, filed Jan. 16, 1984 for "Laser Disinfection of Fluids", and assigned to the assignee of this application, there is disclosed a method and apparatus for disinfecting a fluid such as water which involves passing a stream of the fluid through a laser beam which radiates coherent light in the ultraviolet range. The application particularly discloses methods and apparatus which use a gas pulsed laser whose rate of pulse may be adjusted and therefore whose intensity of light may also be adjusted. The gas pulsed laser is of the type which employs a spark gap switch as the means by which the pulsing of the gas pulsed laser is triggered.

The efficacy of the disinfection apparatus and process of the aforesaid application is enhanced by suspended particles in the water or other fluid being treated. Such particles have the effect of scattering the laser beam and making it more likely that any bacteria will be exposed to coherent ultraviolet light. The suspended particles do, however, afford a support for bacteria and may as a result shield the bacteria from exposure to the coherent ultraviolet light. One approach to solving that problem is to move the fluid at a relatively high velocity so that the suspended particles will be caused to tumble and all sides will be exposed.

There are occasions when the turbidity of the fluid is insufficient to provide the necessary suspended particles to cause the desired dispersal of the laser beam. There are other occasions when the fluid, although high in turbidity, cannot be moved at a sufficient velocity so as to cause the necessary tumbling to expose all sides of the suspended particles to the coherent ultraviolet light.

The spark gap switch in a gas pulsed laser generates a considerable amount of ozone during its operation. The ozone is damaging to the equipment and can be offensive to personnel. At the same time, ozone is a known disinfectant which can be advantageously utilized.

The present invention makes advantageous use of the ozone which is a by-product of the gas pulsed laser and at the same time enhances the laser disinfection of the water. By disinfection is meant the ability to kill bacteria primarily by direct contact rather than by secondary photochemical effect. Although the method and apparatus of this invention is particularly adapted for the treatment of water, it can also be employed to disinfect fluids generally, including those which are water based and those which are not, and including gases such as air.

SUMMARY OF THE INVENTION

In the method according to this invention, bubbles of a gas are introduced into a stream of the fluid to be disinfected and the stream is passed through a laser beam which radiates coherent light in the ultraviolet range. In the preferred form of the method, the gas is ozone which is obtained as a by-product of the generation of the laser beam. Also, preferably, the bubbles of gas are introduced into the stream upstream of the point of which the laser beam intersects the stream.

An apparatus in accordance with the present invention includes a fluid container having an inlet and an outlet, means for introducing bubbles of gas into the fluid in the container, and a laser having its beam directed into the fluid in the container between the inlet and outlet, the laser beam radiating coherent light in the ultraviolet range. In the preferred form of the apparatus, the laser is a pulsed gas laser which is excited by a spark gap switch, the ozone produced by the spark gap switch is fed into gas outlets in the fluid container to provide the bubbles. Also in one preferred form, the gas outlets are disposed along the side of the container from adjacent the bottom to the top to provide a wide dispersal of bubbles.

The bubbling gas will have the effect of scattering and reflecting the coherent ultraviolet light from the laser beam to thereby insure that all bacteria will be exposed to the ultraviolet light. The bubbles will also have the affect of creating turbulence in the fluid which will cause suspended particles in the fluid to tumble and expose all surfaces of the particles to the coherent ultraviolet light.

It is a principal object of the invention to provide an improved method and apparatus for the disinfection of water and other fluids using a laser beam.

It is another object of the invention to provide such a method and apparatus which scatters the laser beam by the use of bubbles of gas admitted into the stream of fluid being treated.

It is yet another object of the invention to provide a method and apparatus for the laser disinfection of water and other fluids which employs the ozone by-product of the laser in a manner which assists in the disinfection of the fluid.

The foregoing and other objects and advantages of the invention will appear in the detailed description which follows. In the description reference is made to the accompanying drawings which illustrate a preferred embodiment of the invention.

DETAILED DESCRIPTION OF THE PREFERRED EMBODIMENT

Figure 1:
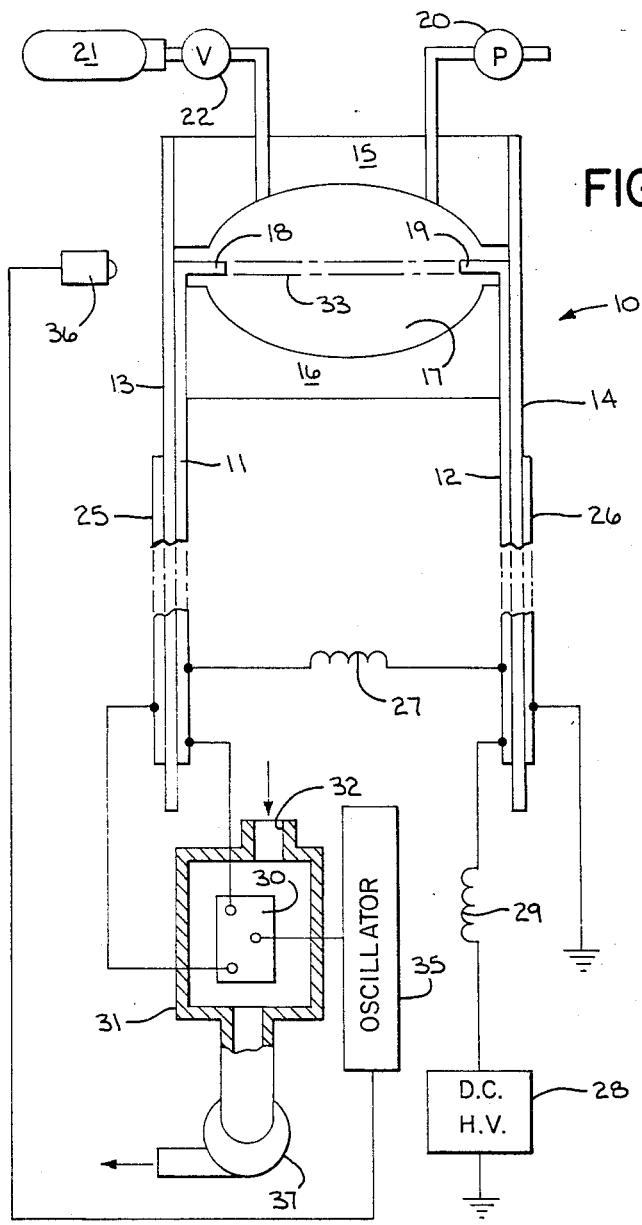
FIG. 1 is a top plan view, partially schematic, of a pulsed gas laser which forms a part of the method and apparatus of the present invention.

Referring to FIG. 1, a laser 10 is illustrated which is a modification of a pulsed gas laser of the type described in U.S. Pat. No. 3,757,248 issued Sept. 4, 1973 to Small for "Pulsed Gas Laser". The laser includes a pair of electrodes 11 and 12 each of which constitute one plate of a capacitor. The electrodes 11 and 12 are arranged on respective inner surfaces of a pair of dielectric plates 13 and 14, respectively, which are mounted parallel to each other and which are secured on opposite sides of a chamber assembly formed of chamber halves 15 and 16. The chamber halves 15 and 16 together define a chamber cavity 17 which is oval shaped and which extends longitudinally of the chamber assembly. The electrodes 11 and 12 are turned toward each other within the chamber 17 so that the respective electrode ends 18 and 19 confront each other and are spaced apart within the chamber 17. The chamber is connected to an evacuation pump 20 and is fed by a source of gas 21 which may be a pressure cylinder operating through a regulator valve 22.

A pair of conductive plates 25 and 26 are formed on the opposite, outside surfaces of the dielectric plates 13 and 14, respectively. Both of the conductive plates 25 and 26 are connected to ground. The electrode plates 11 and 12 are connected to each other through an induction coil 27 and the electrode plate 12 is connected to a high voltage d.c. source 28 through an induction coil 29. The high voltage d.c. source 28 will charge the electrode plate 12 and will thereafter charge the electrode plate 11 through the coil 27. A spark gap switch 30 mounted in a housing 31 having an air inlet 32 connected to the electrode plate 11 and will ground that plate periodically when the spark gap switch arcs. The sudden grounding of the electrode plate 11 will produce a very high potential across the gap between the electrode ends 18 and 19 such that electrons will flow between the ends. If the chamber is filled with a lasable gas such as nitrogen, the flow of electrons will cause lasing and a laser beam having a substantial width will result. The beam is illustrated in FIG. 1 in phantom lines and is identified by the reference numeral 33. By the proper selection of the gas, the laser 10 will produce a beam 33 which radiates coherent light in the ultraviolet range. Nitrogen is one such gas. The shape of the beam, that is one having a significant width, is in contrast with the typical laser beam which is a small diameter beam of light.

In a laser 10 usable in my invention, the exciting voltage produced by the high voltage source 28 may be in the magnitude of 30,000 volts with a gas pressure within the chamber 17 of 100 torr. This would produce a laser beam 33 which is about an inch wide and two feet in length.

Figure 3:
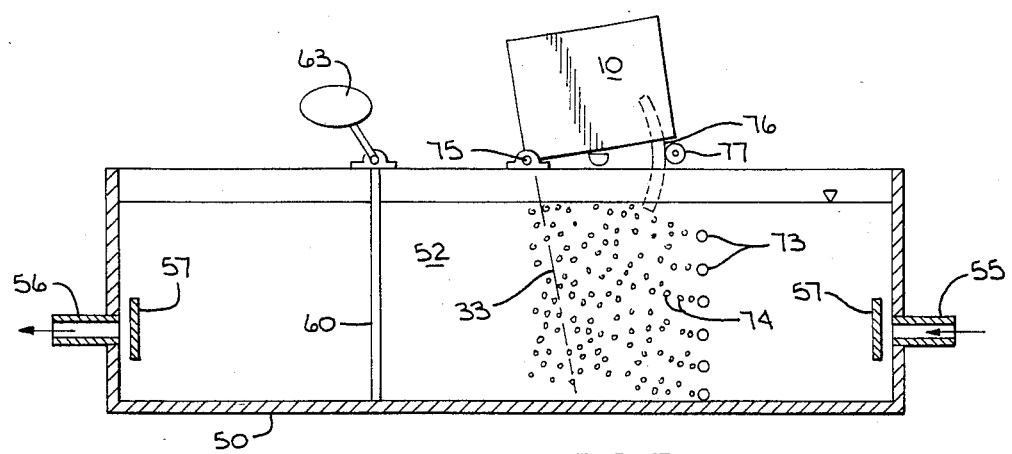
FIG. 3 is a view in longitudinal cross-section of the flume of FIG. 2.

The spark gap switch 30 can be periodically actuated to arc by use of an oscillator 35 in a known manner. The rate of arcing of the spark gap switch and therefore the rate of pulsing of the laser 10 is adjustable for conditions of operation and conditions of the fluid being treated. That variation can result from the oscillator 35 being controlled by a photocell 36 which senses the turbidity of the fluid being treated. An alternative arrangement for controlling the pulsing of the laser is shown in FIG. 3.

The spark gap switch 30 will produce a considerable amount of ozone during its operation. The ozone is corrosive of the components of the switch and the surroundings and can also be offensive to personnel working in the area. Therefore, the ozone must be absorbed, such as with steel wool which must be continuously replaced, or the ozone must be evacuated from the housing and disposed of in a controlled manner. In our invention, the ozone is evacuated from the housing 31 by a blower 37 and the evacuated ozone is used to advantage rather than being discarded as an unwanted by-product.

Figure 2:
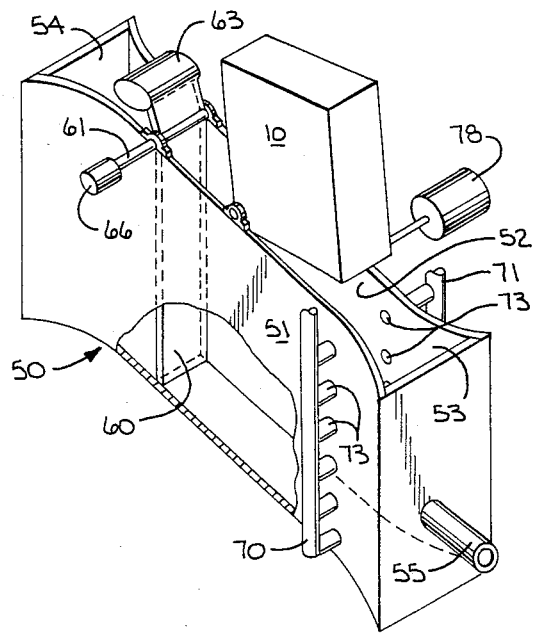
FIG. 2 is a view in perspective of the invention as applied to a flume arrangement for disinfection of a fluid using the laser of FIG. 1.

Referring to FIG. 2, the laser 10 is shown mounted in relation to a flume structure indicated generally by the reference numeral 50. The flume 50 includes a container having a pair of upright side walls 51 and 52. The side walls are flared at both ends to form an inlet portion 53 and an outlet portion 54 communicating with respective inlet and outlet pipes 55 and 56. Between the flared ends, the side walls 51 and 52 are parallel and define an area of constant cross-section. Baffle plates 57 are disposed opposite the inlet and outlet pipes 55 and 56. A dam 60 fills the cross-section of the flume 50 and is mounted at its top on an axle 61 held in bearings 62 disposed on the opposite tops of the side walls 51 and 52. A counterweight 63 projects above the axle. The dam will control the flow of water through the flume and will be pivoted in the event of significant changes in the rate of flow. The dam 60 maintains the water depth in the flume and keeps the distance which the beam travels through the air to a minimum. The distance between the laser 10 and the surface of the water is exaggerated in the drawings. The laser 10 is mounted at the top of the flume 50 and has its laser beam projecting downwardly into the water passing through the flume.

The laser beam fills the constant cross-section of the flume 50 so that a stream of water flowing through the flume will be passed through the beam and all of the water will be exposed to the beam. The exposure to the coherent ultraviolet light will disinfect the water by contact kill of the bacteria in the water. Since the total dosage of the ultraviolet light is important, the intensity of the laser beam is preferably adjusted to reflect the changes in the rate of flow of water passing through the beam. The intensity of the laser beam is controllable by adjusting the pulse rate of the laser. This can be accomplished by adjusting the oscillator 35.

The dam 60 will respond to the flow of water through the flume and its angle relative to the vertical will change as flow changes. That is, the greater the flow the further the dam will be moved away from vertical. This change in position of the dam 60 is sensed by a resolver 66 which is connected to the axle 61 for the dam. The resolver 66 can then send a signal to the oscillator 35 to thereby vary the rate at which the laser 10 is pulsed. For greater flow rate, the laser must be pulsed at a faster rate since there will be a reduction in the time of exposure to the laser beam.

The outlet of the blower 37 is connected to a pair of manifolds 70 and 71 disposed on either side of the flume 50. Each manifold leads to gas nozzles 73 which extend into the side walls 51 and 52 of the flume 50. The ozone evacuated from the housing 31 surrounding the spark gap switch 30 is thereby fed into the flume 50 and will be admitted into the stream of water passing between the inlet 55 and outlet 56 in the form of bubbles 74 which are released upstream of the laser beam 33. The bubbles 74 of ozone will be dispersed throughout the stream of the water and will be carried downstream into the laser beam 33. The bubbles 74 will intersect and reflect the laser beam 33 as the beam passes through the stream. The result will be that the ultraviolet light of the laser beam will be scattered so that it can reach all surfaces of suspended particles within the fluid on which bacteria may be attached. The scattering will also enhance the probability that the bacteria will be exposed to the ultraviolet light. The bubbles of ozone will also have the effect of creating turbulence within the stream of fluid and thereby cause suspended particles to tumble and be more likely to be exposed to coherent ultraviolet light from the laser beam.

The scattering effect of the bubbles can also provide the necessary ultraviolet light reflection to the sensor 36 which is employed to adjust the rate of pulsing of the laser and therefore its intensity. That is, the greater the scatter sensed by the sensor 36 the faster the laser could be pulsed to increase the intensity. The scatter will be the combination of the scatter produced by the bubbles 74 and by suspended solids in the water so that as the turbidity of the water increases the amount of scattered light sensed by the sensor 36 will increase and the rate of pulsing of the laser can be proportionally adjusted.

Instead of adjusting the pulse rate as changes in scattered light are sensed by the photocell 36, the angle of entry of the laser beam into the stream of water may also be adjusted. To this end, the laser 10 of FIGS. 2 and 3 is mounted on one end on a pivot shaft 75 held in bearing blocks mounted on the tops of the side walls 51 and 52. A sector gear 76 is mounted on the laser 10 with its center of generation located at the pivot shaft 75. A pinion 77 engages the teeth of the sector gear and the pinion is driven by a motor reducer 78 responsive to signals from the photocell 36. For greater turbidity, the laser beam 10 would be automatically positioned by rotation of the pinion in response to sensed light to a position in which the beam is more nearly vertical.

In addition to providing desirable fluid turbulence and scattering of the laser beam, the bubbles of ozone will also contribute to the disinfection of the water directly by contact with the bacteria in the water.

Although the use of ozone is preferred since it would otherwise be an undesirable and wasted by-product and is itself a disinfectant, the advantageous affects of scattering and turbulence can be achieved by bubbles of other gases, including air. Also, gases such as chlorine or other halogens, oxygen or hydrogen, all of which have known uses in water and fluid treatment may also be employed. In the case of air, the manifolds 70 and 71 may be connected directly to a blower or air compressor. In the case of chlorine, oxygen or hydrogen the manifolds 70 and 71 may be connected to a tank of the gas through suitable control valving.

In the embodiment of FIGS. 2 and 3 the gas outlets are shown lining the sides of the container. An alternative approach is to admit the gas at the very bottom of the container. Such a point of introduction may be less disruptive of the controlled cross-section flow which is desired within the flume.

We claim:

1. A method of disinfecting a liquid, comprising:
   introducing bubbles of a gas into a stream of liquid to be treated; and
   passing the stream of the liquid with the bubbles through a laser beam which radiates coherent light in the ultraviolet range.

2. A method in accordance with claim 1 wherein the gas is ozone.

3. A method in accordance with claim 1 wherein the gas is selected from the group consisting of ozone, oxygen, hydrogen and chlorine or other halogens.

4. A method in accordance with claim 1 wherein the bubbles of gas are introduced into the stream upstream of the laser beam.

5. The method of disinfecting water, comprising the steps of:
   providing a stream of water to be treated;
   generating a pulsed gas laser beam which radiates coherent light in the ultraviolet range through the use of a spark gap switch;
   evacuating the ozone from the spark gap switch;
   bubbling the ozone into said stream; and
   directing said laser beam through said stream.

* * * * *